Oct. 22, 1935.   R. A. LAKE   2,018,368
END-OF-LINE INDICATOR
Original Filed July 13, 1932   3 Sheets-Sheet 1
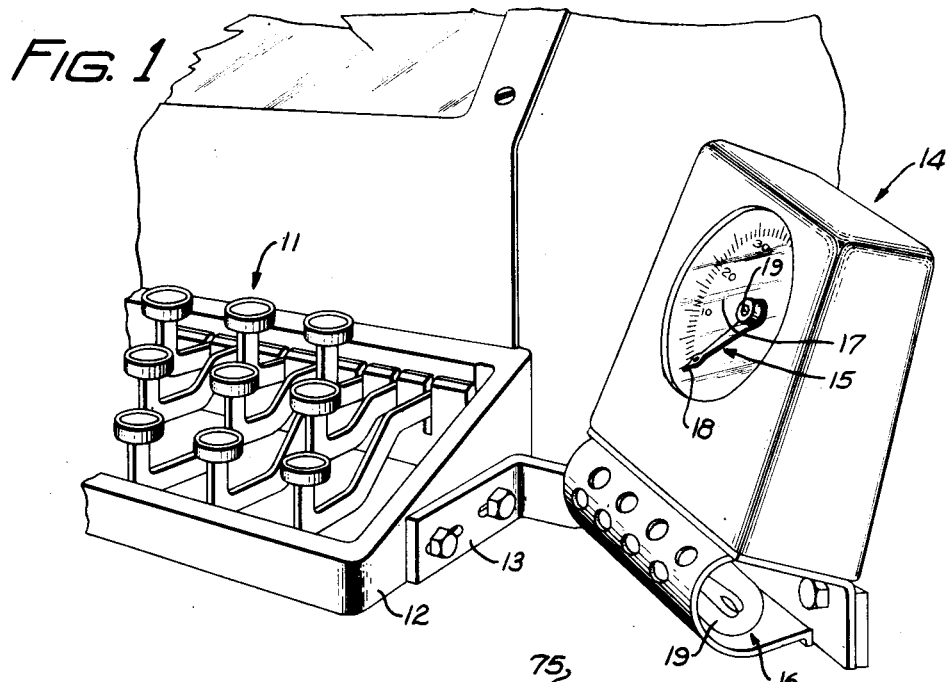
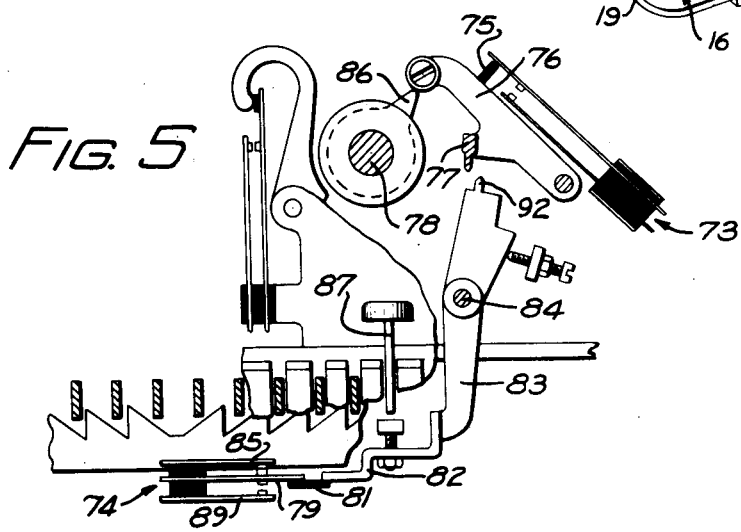
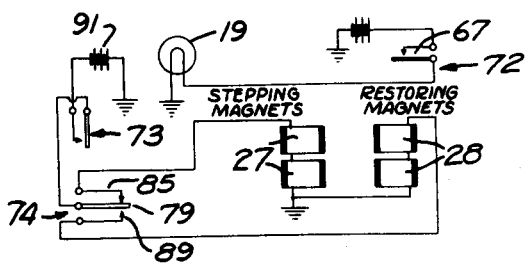
INVENTOR
ROSS A. LAKE
BY
ATTORNEY Oct. 22, 1935.   R. A. LAKE   2,018,368
END-OF-LINE INDICATOR
Original Filed July 13, 1932   3 Sheets-Sheet 2

INVENTOR
ROSS A. LAKE
BY H. B. Whitfield
ATTORNEY

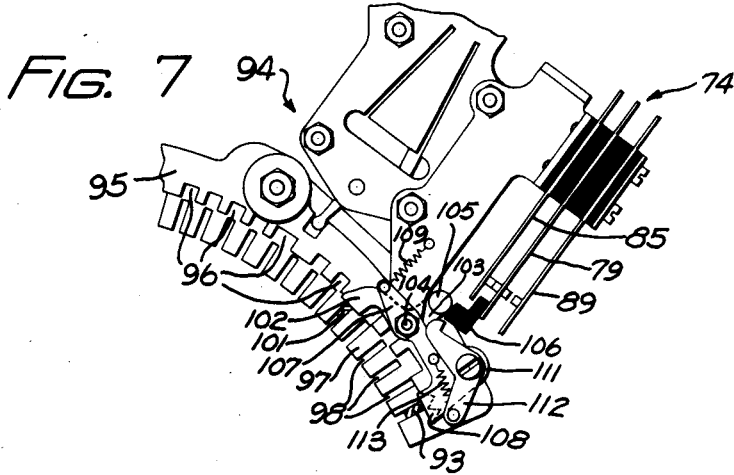
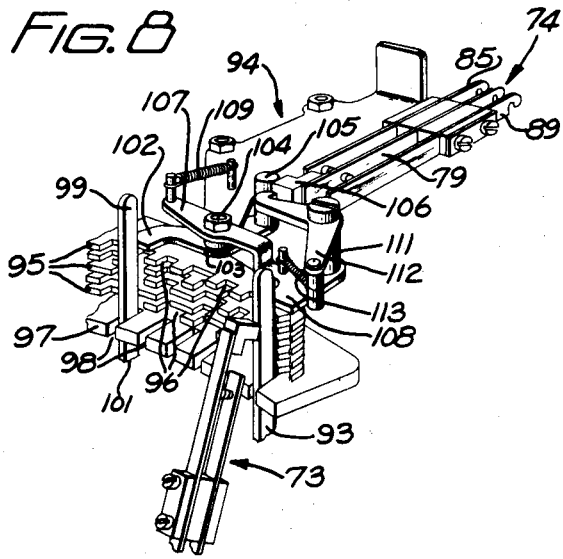
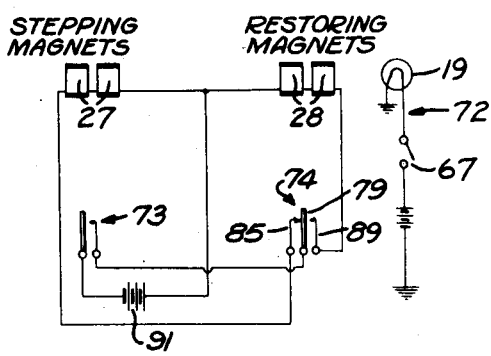

Patented Oct. 22, 1935

2,018,368

UNITED STATES PATENT OFFICE 2,018,368

END-OF-LINE INDICATOR

Ross A. Lake, Chicago, Ill., assignor to Teletype Corporation, Chicago, Ill., a corporation of Delaware Application July 13, 1932, Serial No. 622,180
Renewed January 12, 1935

21 Claims. (Cl. 178—25)

The present invention pertains to improvements in printing telegraph apparatus and more particularly to mechanism for recording and indicating the number of signal operations transmitted or received.

Among the objects of the present invention, one is to provide a mechanism that may be readily applied to a printing telegraph transmitter and that will indicate to the transmitting operator in terms of predetermined line units the number of signal operations that have been transmitted and/or received in order that the approach of the end of a line of printing may be noted.

In printing telegraph practice there have come to be used two general types of devices, one in which the record is printed on a continuous strip of material and where the printing element is stationary with respect to the platen, such as is exemplified by United States Patent No. 1,745,633 and another in which the record is printed transversely by a movable or floating printing element upon a full width page or web, as is exemplified by United States Patent No. 1,904,164, granted April 18, 1933. These two general classes of devices though differing structurally, as may be seen from the references, are nevertheless controllable by and capable of transmitting the same class of signal impulses, so that devices of either class may be connected with those of the other and operated associatively. Since, however, the former class of device, which for convenience will be referred to hereinafter as tape printers are adapted to print consecutively without interruption for purposes of carriage return or line feed operations and since in contradistinction therewith the latter class of device, which for convenience will be referred to as page printers, may not be thus continuously operated but must of necessity receive line feed and/or carriage return signals, this sole distinction makes it impractical commercially to use the two classes of devices together; that is, in communication with each other without some means for indicating in connection with the transmitter associated with the tape printer the approach of the end of a line of page printing.

Accordingly, another object of the present invention is to provide a means such as an indicator that may be attached to a tape printer which will record the character operations individually and indicate by a special signal when a predetermined number of characters have been transmitted and/or received.

Printing telegraph apparatuses of the class referred to comprise complete unitary structures including transmitting mechanism controlled by a keyboard which serves to issue permutation code signals over a line and receiving mechanism connected to the same line which is responsive to signals of a line character issuing from a distant transmitter. The printing mechanism of each unit is responsive to both the incoming signals which are transmitted by the remote station and the outgoing signals transmitted by the local keyboard and transmitting apparatus so that the printed record at each station includes a complete entry of the whole intercommunication. Since the difficulty of coordinating the two classes of devices presents a problem only to the transmitting operator employing the tape printer the application of the present invention is requisite only upon this type of apparatus. Where, however, if for any other purposes, it is desired to maintain a visual indication of a cumulative record before a transmitting operator the present invention may also be readily employed for such purposes. It is noted, therefore, that while the present invention will be described in connection with the particular object of coordinating the two classes of devices that are at present in commercial use, that its utility is by no means limited thereby but that it is intended as an improvement having general application as a counter for electrical impulses.

In general the present invention comprises an electrically controlled device having two types of indicators one of which is a recording indicator and displays progressively the sum total number of signal impulses that are transmitted subsequent to its previous resetting, while the other is an alarm signal in the form of an incandescent electric lamp which indicates the recordation of a predetermined number of the aforementioned signals. Both of the indicators coact in response to the same impulses and may be made to record either the received signals, the transmitted signals or both, though as stated above the latter is the general commercial practice. This invention also comprises novel adaptations of an indicator, such as the one disclosed, to the well known structures of present existing commercial telegraph instruments and, as referred in the description hereinafter, embodies the utilization of certain practices and the accomplishment of the improved results particularly described and noted in connection with the detailed description thereof following hereinafter.

More specifically, the invention contemplates the use of a dial or other class of index that is capable of recording and indicating successive impulses which are impressed upon a stepping magnet electrically and thereafter communicated to the dial mechanically. Another magnet is adapted upon energization to release the dial and permit it to be restored to zero or normal position.

In accordance with one application of this invention, the impulses which control the energization of the stepping or operating magnet are determined by a circuit breaker that is controlled by a cam carried upon an operating shaft of the transmitter mechanism which shaft is cyclically rotatable with the transmission of each character signal. With this practice the indicator is responsive to the transmitted or outgoing signals only. However, in accordance with another embodiment hereinafter disclosed, the circuit breaker is controlled by an element of the printing unit that is equally responsive to the transmitting as to the receiving mechanisms and hence is capable of recording both incoming as well as outgoing signals.

The indicator controls an alarm circuit after a predetermined number of recordations have been impressed to apprise the operator of that fact after which he may transmit a carriage return signal. The control switch for the releasing magnet is located adjacent the keylever for sending this signal so that as it is depressed for issuing the signal the indicator is simultaneously restored and placed in readiness for recording the signals of the next line.

With the foregoing and other objects in view this invention consists in the features herewith set forth, illustrated in the accompanying drawings and particularly described in the hereinafter appended claims.

In the drawings, Fig. 1 is a fragmentary perspective view of a telegraph transmitting and receiving unit generally similar to the one disclosed in United States Patent No. 1,745,633, issued to S. Morton et al., showing the application thereto of an indicator which embodies the features of the present invention.

Figure 2:
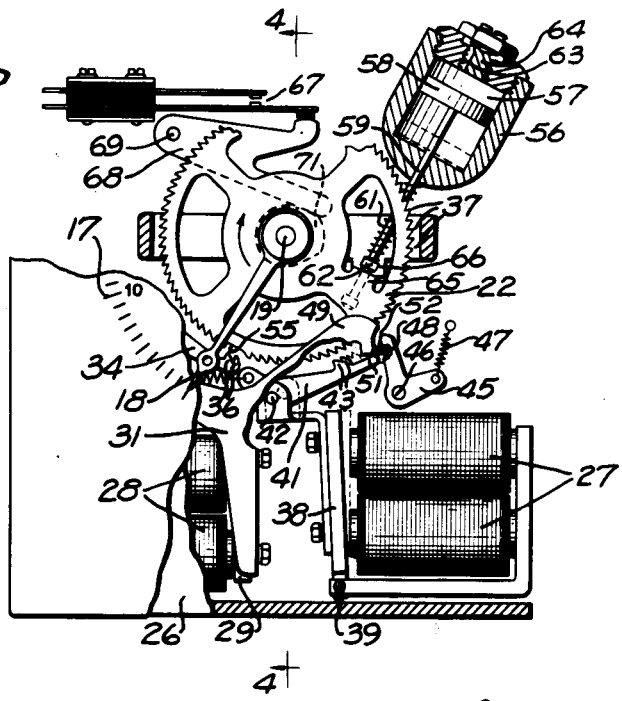
Fig. 2 is a front elevational view of the operative structure of the indicator illustrated in Fig. 1 with certain parts broken away.
Figure 3:
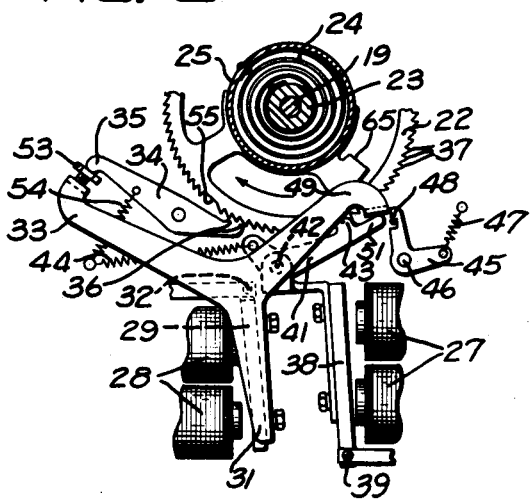
Fig. 3 is a fragmentary front sectional view taken approximately on line 3—3 of Fig. 4 and illustrating a condition of operation differing from that shown in Fig. 2.

Fig. 5 is a fragmentary sectional view of an operating shaft such as is employed in a tape printer of the class above referred to and such as is more fully shown in Figs. 2 and 3 of United States patent to H. L. Krum, No. 1,595,472.

Fig. 6 is a simplified wiring diagram of an electrical control circuit that may be employed in connection with the present invention as disclosed in Fig. 5.

Fig. 7 is a fragmentary plan view of a selector mechanism illustrated in Fig. 1 of the Morton patent supra showing a modified application thereto of switches which control the operation of the counting mechanism.

Fig. 8 is a detail perspective view of the subject matter illustrated in Fig. 7.

Fig. 9 is a simplified wiring diagram featuring the modified application illustrated in Fig. 7.

Referring now particularly to Fig. 1, the numeral 11 indicates generally the keyboard of a tape transmitter having subjacent thereto a keyboard base casting 12 to which is secured a bracket 13 and which in turn supports an indicator unit, illustrated generally, 14. The unit 14 comprises two indicator devices 15 and 16, the former of which includes a dial 17 and an index hand 18 for denoting progressively the number of signals transmitted or received while the latter comprises an alarm index including an incandescent lamp 19 which is operative only after a predetermined number of the aforementioned individual signals have been received.

Figure 4:
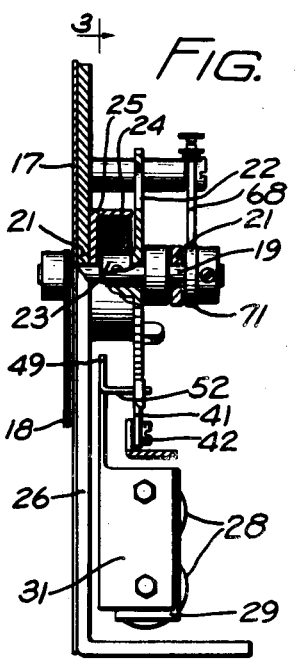
Fig. 4 is a sectional view taken approximately on line 4—4 of Fig. 2 showing certain parts in elevation.

In Figs. 2 and 4 are shown the indicator 14 which includes the annular dial 17 having radial graduations inscribed thereon in the path of revolution of the index hand 18 pivotally journalled with a shaft 19 upon bearings 21 which form part of the supporting structure of the unit. Shaft 19 also carries secured to it a ratchet wheel 22 in definite angular relationship to the index hand 18. A hub 23 which may be formed integrally with ratchet wheel 22 has secured to its periphery one end of an involute coil spring 24 the other end of which is fastened to a shell 25 mounted on the rearside of a dial plate 26 and adapted, when the shaft 19 is rotated in a counterclockwise sense as viewed in Fig. 3, to be wrapped about hub 23 and to store thereby a counterclockwise potential for urging the ratchet wheel back to normal position as will be evident from the following description. Below and at each side of ratchet wheel 22 are a pair of magnets, the right side ones 27 of which will be referred to as the operating or stepping magnets for the reason that they act to advance the index hand 18 and ratchet wheel 22 in acordance with the recorded impulses while the left side magnets 28 will be referred to as the restoring or release magnets for the reason that they operate to release the hand 18 in preparation for a new line of signals.

The normal condition of operation is indicated in Fig. 3 wherein both of the magnets 27 and 28 are deenergized and during which condition an armature 29 pivoted at 32 and having fastened to it a lever 31 is disposed as indicated in this figure. During such normal condition one arm 33 of the lever 31 which is adapted to engage a cooperating arm 35 of a release pawl 34 remains sufficiently clear therefrom so as to permit the latter by its teeth 36 to engage teeth 37 of a ratchet wheel 22. Another armature 38 pivoted at 39 is adapted to be acted upon by magnets 27 and pivotally carries an operating pawl 41 which is a floating member pivoted at 42 and spring urged to engage the teeth 37 of ratchet wheel 22 with its engaging teeth 43.

During an interval in which the magnets 27 are first energized and then deenergized pursuant to each operating signal the stepping pawl 41 is moved rightwardly to engage a new tooth 37 of the ratchet wheel 22 and then to be moved leftwardly by spring 44 concurrently advancing wheel 22 one tooth distance and bringing into registration with the teeth of release or holding pawl 34 the next consecutive tooth 37 of ratchet wheel 22.

A bellcrank 45 is pivoted at 46 and is urged by a spring 47 connected to one arm thereof in a counterclockwise direction while its other arm is provided with a notch 48. One arm 49 of lever 31 extends over the extremity 51 of operating pawl 41 and engages with a portion 52 (Fig. 4)

angularly disposed therefrom the foremost extremity 51 of pawl 41.

Upon the energization of magnets 28 the armature 29 and its associated lever 31 are attracted to rotate clockwise, Fig. 2, and in so doing arm 33 through an adjustable engagement screw 53 carried by it is adapted to move release pawl 34 against the tendencies of its spring 54 out of engagement with the teeth 37 of ratchet wheel 22, while at the same time the angular portion 52 of arm 49 engaging the extremity 51 of floating pawl 41 also withdraws the latter from engagement with teeth 37 permitting the ratchet wheel 22 in response to the torque of spring 24 to resume its normal position, as indicated.

After the energization of magnets 28 and the consequent rotation of lever 31 the angular portion 52 of arm 49 is adapted to be engaged by the notch 46 of bellcrank 45 which latter thereby operates to restrain lever 31 against returning to normal position. The bellcrank 45 serves therefore to hold lever 31 in the restoring position even though the energizing current of magnets 28 be released.

For purpose of releasing lever 31 following a restoring signal, operating pawl 41 is provided with the extending portion 51, Fig. 2, so that in response to an operating signal next following a restoring signal the rightward movement of armature 38 and pawl 41 serves to rotate bellcrank 45 clockwise compelling the latter thereby to release its hold upon the angular portion 52 of lever 31 and permit lever 31 to resume its normal position of Fig. 3, while at the same time allow pawl 41 to engage an advanced tooth 37 of ratchet wheel 22 and thereby effect the recordation of the particular signal as well. Thus, the restoring mechanism is actuated and the first character is recorded upon the indicator under the control of an initial operating signal.

The number of teeth 37 upon the ratchet wheel 22 will correspond to the maximum number of character impulses that may be necessary to fill a line upon a page printer. In accordance with the proposed use of the present invention and in order to prevent the inadvertent continuous operation of the operating magnets 27 in excess of the number of such operations that are capable of being recorded, means are provided for incapacitating the recording mechanism after a maximum number of recordations have been made. This is accomplished by mutilating the ratchet wheel as at 55 so that when the proper number of recordations have been made for presenting this area opposite the teeth 43 of operating pawl 41 the latter member will be unable to engage teeth subsequent to this point so that despite its reciprocating movement in response to the energization of magnet 27 thereafter ratchet wheel 22 will remain in this position.

The release of ratchet wheel 22 in response to the energization of magnets 28 causes the latter to be restored with considerable velocity and in order to minimize the shock upon its sudden stop, a dash pot 56 is provided which has a cylindrical air chamber 57 in which is adapted to move a close fitting piston 58. A rod 59 secured to piston 58 is provided with a coil spring 61 and a shouldered portion 62 at the extremity thereof against which said spring 61 is adapted to urge for maintaining said piston and rod in its foremost position as indicated in dotted lines in Fig. 2. A port 63 communicates with the chamber 57 for permitting a limited escape of air therethrough upon the upward or compression movement of piston 58 and is made adjustable by the provision of a bleeder valve screw 64.

Upon the release of ratchet wheel 22 from any of its advance positions a shoulder portion 65 formed integrally therewith is adapted first to encounter the head or foremost portion of rod 59 which through the shock absorbing action of dash pot 56 aids in settling wheel 22 until the shoulder 65 thereafter encounters a stop projection 66 extending from the framework.

A pair of contacts 67 control the alarm signal lamp 19 and are adapted to be closed by a lever 68 pivoted at 69, an extended portion of which overlies a cam 71 also mounted on shaft 19. Cam 71 by being radially adjustable on shaft 19 may be made to close the contacts 67 through lever 68 at any predetermined position in the advancement of ratchet wheel 22, so that, accordingly, after a desired number of signal impulses have been transmitted or received the alarm circuit 72, Fig. 6, is closed and the incandescent lamp 19 lighted.

In the preferred embodiment, as illustrated in Fig. 5, two switches 73 and 74 are installed upon certain mechanisms of a printing machine as follows:

The single contact switch 73 having an insulated extension 75 is disposed to engage one arm 76 of a reciprocating bail 77 which operates regularly with the transmission of each character. This bail, as more fully described and illustrated in Figs. 2 and 3 of United States Patent No. 1,595,472 receives its motion from a cyclically rotating cam shaft 78 so that since bail 77 is made to operate once during the transmission of each character so also the pair of contacts 73 may accordingly be permitted to close once during each cycle.

The other switch 74 is a double contact type and has a center tongue or contactor 79 to which is secured an insulated portion 81 adapted to be engaged by an extension 82 of a locking lever 83 pivoted upon shaft 84. Normally the contactor 79 inclines to engage the upper associated contact 85 and to establish a circuit as illustrated in Fig. 6 in communication with the operating magnets 27. During such conditions when the contacts 73 are closed responsive to cam shaft 78 and a cam 86 which acts against arm 76 operating magnets 27 are energized causing the ratchet wheel 22 to be advanced one tooth distance. In this manner wheel 22, shaft 78 and the other elements secured to it are rotated step by step until cam 71 engaging lever 68 closes the contacts 67 energizing alarm signal lamp 19 and indicating to the operator that the proper number of signals have been transmitted to fill a line on a page printer and that a carriage return signal should be transmitted.

The carriage return keylever 87 is indicated in Fig. 5 and is adapted upon its depression to engage the extension 82 of lever 83 forcing contactor 79 away from engagement with upper associated contact 85 and into engagement with lower associated contact 89. This prepares electrical communication between common battery 91, Fig. 6, and restoring magnets 28 instead of with stepping magnets 27 while the concurrent closure of contacts 73 caused by the regular cyclic operation of cam shaft 78 at the same time closes the aforedescribed circuit energizing the restoring magnets 28 and permitting ratchet wheel 22 under influence of its spring 24 to be returned to its starting position.

Contactor 79 is assured sufficient time during which to engage its lower contact blade 89, by reason of a mechanical response of the transmitting mechanism peculiar to the unit illustrated in Fig. 5. When lever 87 is depressed it causes the counterclockwise rotation of lever 83 about pivot 84 and presents the locking tip 92 at the left side of bail 77 so that when the latter is permitted to drop in accordance with the contour of the operating cam 86 lever 83 is restrained in this position until the conclusion of the cycle at which time cam 86 again raises the extended portion 76 of bail 77 thereby releasing lever 83. With the aforedescribed installation of switch 73 upon extended portion 76 of locking bail 77 indicator 15 is made to function only during the operation of the transmitting mechanism of the local station and not during the operation of the receiving mechanism thereof.

Since the printing unit, as described above, is responsive to both transmitted and received signals, a modified application of the present invention is illustrated in Figs. 7 and 8 in which the control switches 73 and 74 are applied to the printing unit. In this case the double contact switch 74 is secured adjacent the selecting mechanism of the printing unit and the single contact switch 73, Fig. 8, is disposed to be controlled by a detent 93 which is operated concurrently with each of a plurality of selectable elements upon the operation thereof. The selector mechanism generally indicated 94 is more fully described in United States Patent No. 1,745,633 mentioned above, however, for purposes of explaining the present invention some of the selective action will be related as follows:

A set of arcuate segments 95 are each provided with a number of notches 96 so arranged that upon every positionment of the several segments 95 a certain transverse alignment of notches 96 is arranged. Below the segments 95 is an arcuate comb 97 and in each space 98 thereof resides the upper extremity 99 of a selectable element or bar, such as the one illustrated 101. When a transverse alignment of notches 98 is afforded opposite a particular element 101 an individual spring (not shown) carried thereby urges it into the space afforded whence it comes into operative engagement with a common actuating bail (not shown) which thrusts the element upwardly actuating the type bar associated with it or performing a special function, as the case may be.

The element 101, illustrated in Figs. 7 and 8 happens to be the carriage return selector bar and upon its selection, in moving forward, it engages an extended portion 102 of one arm of a bellcrank 103 pivoted at 104, the other arm of which carries a stud pin 105 that is adapted to engage the insulated block 106 of contactor 79. Lever 107 also pivoted at 104 is provided with a projection 108 normally adapted to be disposed in the path of detent 93 and maintained in this position under influence of a spring 109 engaging an opposite end of lever 107. Upon the adjacent end of lever 107 is mounted a pivot stud 111 which carries a bellcrank latch 112 pivotally thereon normally urged in clockwise direction by a coil spring 113.

Upon the selective operation of bar 101 detent 93 is also permitted to be moved in the same general direction as it does during the selective operation of any other element such as 101. When this occurs bellcrank 103 is rotated clockwise as viewed in Fig. 7 and lever 107 is rotated counterclockwise. As a result of the movement of bellcrank 103 contactor 79 is urged out of engagement with its left hand associated contact 85 and into engagement with its right hand associated contact 89. At the same time latching bellcrank 112 being carried upon lever 107 is moved into position for engaging and retaining contactor 79 in its right hand position. At the same time the movement of detent 93 forwardly, permits switch 73 to be closed completing the circuit and energizing the restoring magnets 28 as illustrated in Fig. 9.

Thus it will be understood that the indicator will respond to both incoming as well as outgoing signals and that though selector bar 99 is restored to its normal position before detent 93 is withdrawn which is the general mode and sequence of operation that nevertheless contactor 79 will continue to engage its right hand associated contact 89 by reason of its being latched by bellcrank 112. However, before the transmission of a subsequent signal when detent 93 is again moved away from engagement with the projection 108 of lever 107 latch bellcrank 112 being carried upon lever 107 is moved bodily out of range of its engagement with contactor 79, whereupon the latter is restored to normal position in engagement with its left hand associated contact 85.

*General operation*

In the construction illustrated in Fig. 5 switches 73 and 74 are mounted upon the transmitting mechanism of a printing telegraph unit. In its normal position contactor 79 is in engagement with its upper contact 85 preparing the circuit for the stepping magnets 27. Upon the transmission of a character signal, shaft 78 makes one revolution permitting arm 76 and its associated cam follower to descend and close the contacts 73. This energizes the operating magnets 27 Fig. 2 pulling up armature 38 and advancing pawl 41 into engagement with a next consecutive tooth 37 of ratchet wheel 22. This performance is repeated with each operation of the transmitter until a sufficient number of such operations cause the apex of cam 71 to engage lever 68 and close the contacts of switch 67 energizing the alarm circuit 72, Fig. 6. At this time the transmitting operator is apprised of having transmitted a predetermined number of signals to complete a line on a page printer informing him that a carriage return signal should be transmitted. This is accomplished by depressing key 87 which engages extension 82 of lever 83 shifting the contactor 79 out of engagement with its upper associated contact 85 and into engagement with its lower associated contact 89, at the same time causing the transmitting mechanism to send forth a carriage return signal to the remote station for returning the carriage of the printing mechanism thereat. The depression of key 87 also causes the release of ratchet wheel 22 and shaft 19 restoring the indicator 15 to normal position in preparation for the recordation of a subsequent line of character signals.

The energization of the release magnets 28 causes the latching of lever 31 by bellcrank 45 and in order to restore the normal operative condition to lever 31 and its associated elements an initial character signal must be transmitted which will cause the energization of stepping magnets 27 in the usual manner but will in addition to advancing pawl 41 into engagement with the next consecutive ratchet tooth 37 also dislodge bellcrank 45 from engagement with lever 31 at 52 thereby restoring normalcy to the several indicator parts.

While the present invention has been illustrated and described with reference to a particular structure, it will be understood that numerous modifications and variations may be made without departing from the spirit of the present invention. It is therefore intended not to be limited to the particular language of the foregoing description nor to the illustrations in the accompanying drawings but to be permitted a latitude of interpretation as afforded by the following claims.

What is claimed is:

1. In combination with a telegraph transmitter including a cyclically operating cam shaft, a control switch actuated by said cam shaft and a carriage return signal key, of a signal recording mechanism including a progressively operative signal recorder under control of said switch and a cumulative signal indicator, means for actuating said indicator under control of said recorder, and means for restoring said recorder under control of said key.

2. In a telegraph communication system including a station having signal transmitting means and signal receiving means, a mechanism responsive to the signals transmitted and received by each of said means, visual means at said station responsive to said mechanism for indicating to an operator thereat the number of signals transmitted and/or received, and additional means operated by said visual means for indicating to the operator the consummation of a predetermined number of said signals.

3. In a printing telegraph unit, a transmitting mechanism, a receiving mechanism, and a printing mechanism, means for actuating said printing mechanism and a counter for recording the number of signals transmitted and/or received, including a stepping magnet under control of said printing mechanism, and a release magnet for restoring said counter under control of said transmitting mechanism.

4. In a printing telegraph unit, a transmitter, an indicator, means under the control of said transmitter for actuating said indicator including a ratchet wheel, a spring urged pawl for engaging said ratchet wheel, an armature associated with said pawl, an electromagnet for actuating said armature under control of said transmitter, a plurality of teeth on said ratchet wheel to be successively engaged by said pawl for rotating said indicator thereby, and a segment portion of said ratchet wheel having no teeth thereon for thereby preventing the rotation of said ratchet wheel beyond the angular position as determined by the location of said segment.

5. In combination, a telegraph transmitter including a mechanism having an element which receives cyclic movement coincident with each signal transmission, a counter comprising a member rotatable through an angle less than a complete revolution to record in accordance with its movement the number of operations of said element, and an alarm device for tolling the recordation of a predetermined number of said signal transmissions.

6. In an indicator, a rotatable index hand, a wheel rotatable with said hand, a holding pawl active upon said wheel, an advancing pawl active upon said wheel, an electromagnet for actuating said advancing pawl, an electromagnet for releasing said holding pawl, and means operable by said last mentioned electromagnet for simultaneously disengaging said advancing pawl.

7. The combination set forth in claim 6 including a latch operative to hold said means in release position.

8. In an indicator, a rotatable index, a wheel movable with said index, a holding pawl operative upon said wheel, an advancing pawl operative upon said wheel, an electromagnet for actuating said advancing pawl, an electromagnet for releasing said holding pawl, means operable by said last mentioned electromagnet for simultaneously disengaging said advancing pawl, a latch operative to hold said means in released position, and means operable by said first mentioned electromagnet for releasing said latch.

9. In combination, a transmitting mechanism, a receiving mechanism, and a printing mechanism, said several mechanisms being associated in a single unitary structure and said printing mechanism being responsive to said receiving mechanism for printing characters in accordance with the operation thereof, and a ratchet actuated indicator associated with said transmting and said receiving mechanisms and responsive to predetermined volume of operation of said printing mechanism for indicating the progress attainment thereof.

10. In a transmitter, a tabulation indicator including a shaft having a cycle of rotation coincident with each signal transmission, a counter for measuring the operations of said shaft, and an accumulation index pointer for denoting by angular rotation of less than 360° a predetermined number of said operations including a premonitory alarm mechanism subordinated to said counter.

11. In a transmission system, a first station having transmitting and receiving apparatus, a second station having transmitting and receiving apparatus, mechanism at each of said stations responsive cumulatively to the communication signals between the apparatus of each of said stations in both directions, and a premonitory alarm device for apprising an operator at one of said stations of the transmission of a predetermined number of signals by the two stations compositely.

12. In a system of signal transmission, a transmitting apparatus, a receiving apparatus and a channel over which said apparatuses are adapted to communicate with a remote station, an indicating device responsive to the signals issued over said channel by said transmitting apparatus and to the signals received over said channel by said receiving apparatus compositely, and an alarm device operative upon the consummation of a predetermined number of responses by said indicating device to said composite signals.

13. In a printing telegraph system, a station having a transmitting and receiving apparatus, a mechanism at said station responsive to the signals transmitted and received including an operating member capable of executing a movement coincident with each operation of the receiving apparatus, and a recorder for counting and specially indicating a predetermined number of signals transmitted and/or received under the control of the operation of said member.

14. In a printing telegraph unit, a transmitting apparatus, a receiving apparatus, a mechanism responsive to the control of each of said transmitting and receiving apparatuses, cam means associated with said mechanism, and a counter for recording the number of signals transmitted and/or received including a mechanism in communication with said cam means capable of receiving cyclic impulses therefrom.

15. In a selector device, a pair of contactors, a set of coded selecting elements, a member selectively conditioned by a certain arrangement of said elements for closing said contactors, a latch member for retaining said contactors closed, and a secondary selectable member conditioned by a certain other arrangement of said elements for releasing said latch and thereby opening said contactors.

16. A selectively controlled switch including a pair of contact elements, a set of coded elements, means under the control of a certain arrangement of said coded elements for establishing a certain condition of said contact elements, and means for maintaining said condition of said contact elements, said last mentioned means responsive to a certain other arrangement of said coded elements for releasing said last mentioned means.

17. In a telegraph printing apparatus, a set of coded selector elements, a plurality of selectable members each conditioned by a disposition of said elements individual thereto, a pair of electrical contactors, a latch for holding said contactors in closed condition, means responsive to the selective conditioning of one of said selectable members for closing said contactors and placing them under the control of said latch, and means responsive to the selective condition of another of said selectable members for releasing said latch and restoring an open condition to said contactors.

18. In a recording system, an indicator, stepping magnets for advancing the position of said indicator, a spring tending to release said indicator in opposition to the action of said stepping magnets, restoring magnets for releasing said indicator to the influence of said spring, a set of contactors, certain connections between said magnets and said contactors, an automatically selectable element effective upon said contactors for establishing circuit connections between said stepping magnet and a source of electrical energy, and an automatically selectable element effective upon said contactors for restoring said contactors from said aforementioned established condition and for establishing circuit connections between said restoring magnets and a source of electrical energy.

19. In a printing telegraph unit, a selector mechanism responsive to signal impulses, a counter for recording the number of operations of said selector mechanism including a stepping magnet responsive to each operation of the selector mechanism, and a release magnet responsive to a predetermined setting of said selector mechanism and operative to restore said counter.

20. In a printing telegraph unit, a selector mechanism responsive to signal impulses, a counter for recording the number of operations of said selector mechanism including means responsive to each operation of said selector mechanism, and means operative upon a predetermined setting of said selector mechanism, corresponding to the printing of characters sufficient to fill a line, for restoring said counter to its zero position.

21. In a printing telegraph unit, a selector mechanism responsive to signal impulses, a counter for recording the number of operations of said selector mechanism including means responsive to each operation thereof for causing the advancement of said counter, means responsive to a predetermined setting of said selector mechanism for restoring the counter to its normal or zero position, and apparatus controlled by said means for insuring the complete return of said counter to its zero position.

ROSS A. LAKE.